June 3, 1947.  M. H. CODY  2,421,452

OVEN CONTROL

Filed Dec. 29, 1944   3 Sheets-Sheet 3

Inventor
Mervin H. Cody
By Gareth C. Maybee
ATTY.

Patented June 3, 1947

2,421,452

UNITED STATES PATENT OFFICE 2,421,452

OVEN CONTROL

Mervin Hornal Cody, London Township, Middlesex County, Ontario, Canada, assignor to General Steel Wares Limited, Montreal, Quebec, Canada, a corporation of Canada Application December 29, 1944, Serial No. 570,290

11 Claims. (Cl. 219—20)

1

This invention relates to oven controls, and more particularly to an oven control adapted for use with a heat sensitive probe inserted in the article to be cooked or heat treated. When the article is heated to a predetermined internal temperature it is cooked and it is necessary to turn off the heat. In ordinary cooking controlled by the oven temperature, however, a maximum predetermined temperature must be maintained over a period of time, this usually being accomplished by automatically turning off the heating elements permitting the temperature to drop a predetermined amount when the heat is again turned on, and so on until the article has been subjected to the heat for a predetermined time. It is desirable to provide rapid preheating of the oven to the temperature required for the cooking process. It is also desirable to maintain the oven temperature at a desired maximum within close limits, i. e., to avoid too much variation in temperature between the point at which the heating element is turned off and the point at which it is again turned on.

The object of my invention is to devise a control which will satisfy the above requirements and desiderata. I have achieved this object by means of an electronic relay which controls the power circuit to the oven and which in turn is controlled by thermally and manually operated switches to obtain the desired heating conditions.

Although the invention is described in relation to an oven for domestic use for cooking food it will be understood that it is applicable in some of its aspects to commercial ovens for heat treating various articles or substances.

The invention is particularly described and is illustrated by way of example in the following specification and in the attached drawings in which.

In the drawings corresponding numbers in the different figures refer to corresponding parts.

Figure 1:
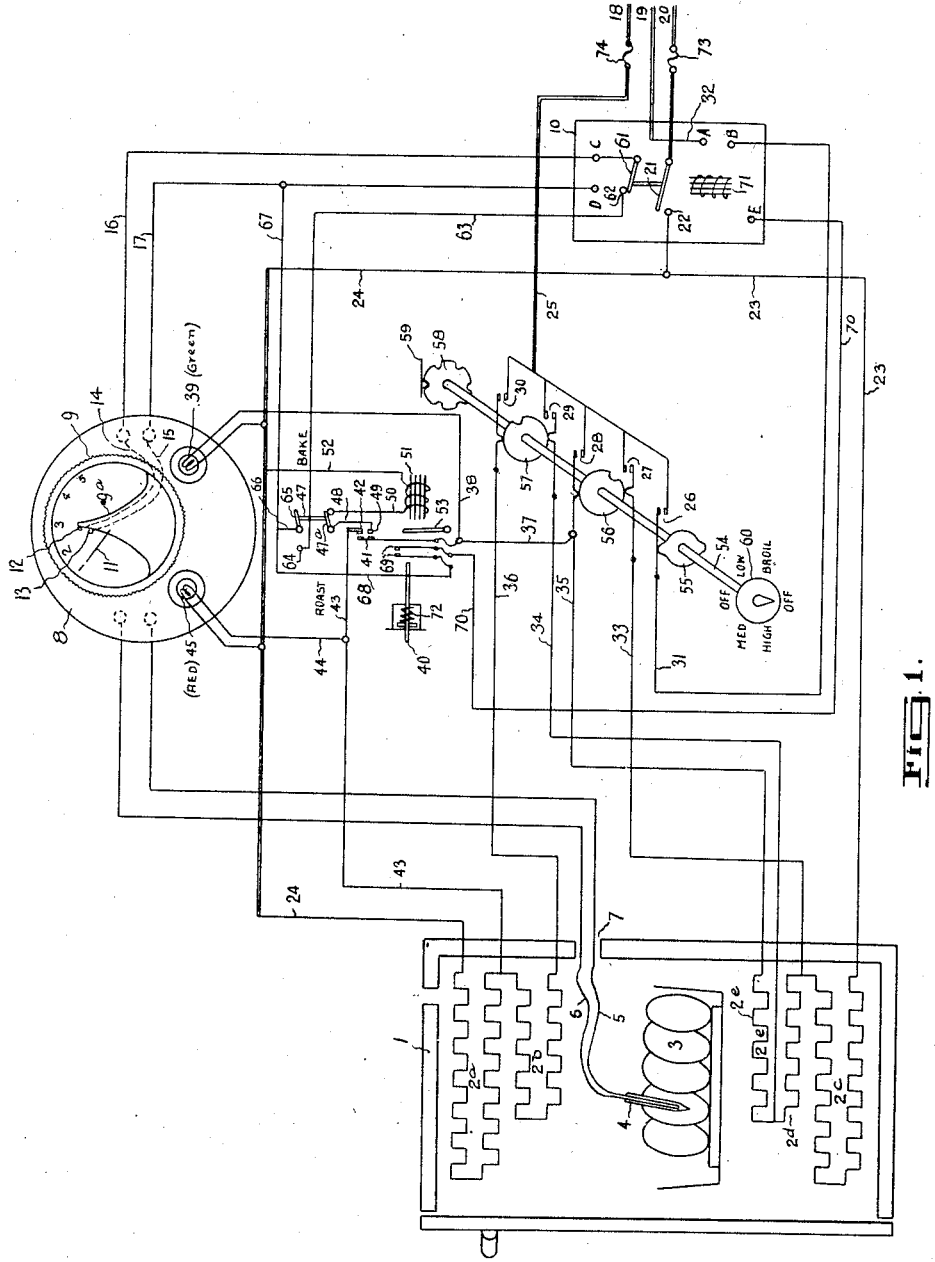
Fig. 1 is a wiring diagram and schematic view of the switches and other apparatus used therewith, showing the connections to the electronic relay, but omitting the details of said relay.

Referring to Figure 1, on oven represented at 1 contains a plurality of heating elements 2a to 2e, inclusive. Preferably, elements 2a and 2b constitute "boiling" elements and are located in the top of the oven, while elements 2c, 2d and 2e are "baking" elements and are located in the bottom of the oven. When one or more of the heating

2 elements 2a to 2e in oven 1 are carrying current, the oven heats up and the heat sensitive probe 4 which contains a thermocouple heats also. When the probe 4 is hooked on the side of the oven it heats to the same temperature as the oven 1. If it is inserted in a roast of meat 3, it heats much slower, and indicates the internal temperature of the meat. As the thermocouple heats, it creates at E. M. F. at its hot junction which produces a current flow in the wires 5 and 6 which go through the wall of the oven at 7, protected by suitable insulators. Wires 5 and 6 terminate in a sensitive electric meter contained within a casing 8. The pointer 11 of the meter indicates the temperature of the thermocouple on a suitable scale. The adjustable knob 9, has an indicator 9a which may be set at any point on the meter scale. Adjustable knob 9 is mounted on casing 8 for rotation about an axis coinciding with the pivotal axis of pointer 11. When the pointer 11 reaches the indicator, it makes an electrical connection between contacts 12 and 13, which move with the indicator 9a and thus completes a circuit between points "D" and "C" in the electronic relay 10. This circuit extends from D through wire 17, lead 15, contacts 13 and 12, lead 14, and wire 16 to C. Completion of this circuit effects operation of the electronic relay 10, as will be explained later.

Current for energizing heating elements 2a to 2e, inclusive, is supplied from a single-phase, three-wire supply circuit 18—19—20 through circuits controlled by a heat selector switch 60 having an operating shaft 54 and a number of cams 55, 56 and 57 for controlling switch contacts 26, 27, 28, 29 and 30. Current to the making elements 2c, 2d and 2e is supplied through a circuit extending from supply line 20, through contact 21 of a power switch embodied in the relay 10, through conductor 23, through one or more of the baking elements depending on the position of the heat selector switch 60, through conductor 25 and back to supply line 18. Current for broiling units 2a and 2b is supplied from supply line 20, through power switch 21, conductor 24, elements 2a and 2b, contact 30 of the heat selector switch 60, conductor 25 and back to line 18. The electronic relay 10 is energized by a connection from terminal A of the relay to neutral conductor 19, and by a connection from terminal B through conductor 31 and contacts 26 on the heat selector switch 60, through conductor 25, and back to supply line 18.

Broiling element 2a is employed for the purpose of preheating the oven under certain conditions.

This is accomplished by providing a manually operated preheating switch having a contact arm or switch blade 41 which engages stationary contacts 42 and 49. Contacts 41—42 complete a connection from the mid-point between elements 2a and 2b through conductor 43 and through conductor 37, heat selector contacts 28, conductor 25 and back to supply line 18. The preheating switch may be manually operated by means of a push-button 48 which presses upon a pair of normally open contacts 69 carried by the armature 58 of the preheating relay, and the relay is maintained in closed position by means of coil 51 acting on the armature 53. Coil 51 is included in a circuit connected in shunt with heating element 2a including conductor 43, contacts 41—42—49, blade 47a of a roast-bake switch 47, conductor 50, and conductor 52 to conductor 24. When the preheating switch is closed, the return circuit for heating element 2a is by way of conductor 43, through the preheating switch to conductor 37 and back to conductor 25 through contact 28 when the heat selector switch is on "low," or from conductor 37 through baking element 2e and then through contacts 29 when the heat selector switch is on "medium," or from conductor 37 through baking elements 2e and 2d in series and through contacts 27 when the heat selector switch is on "high." The preheating relay and the "roast-bake" switch 47 may be mounted within casing 8.

Figure 2:
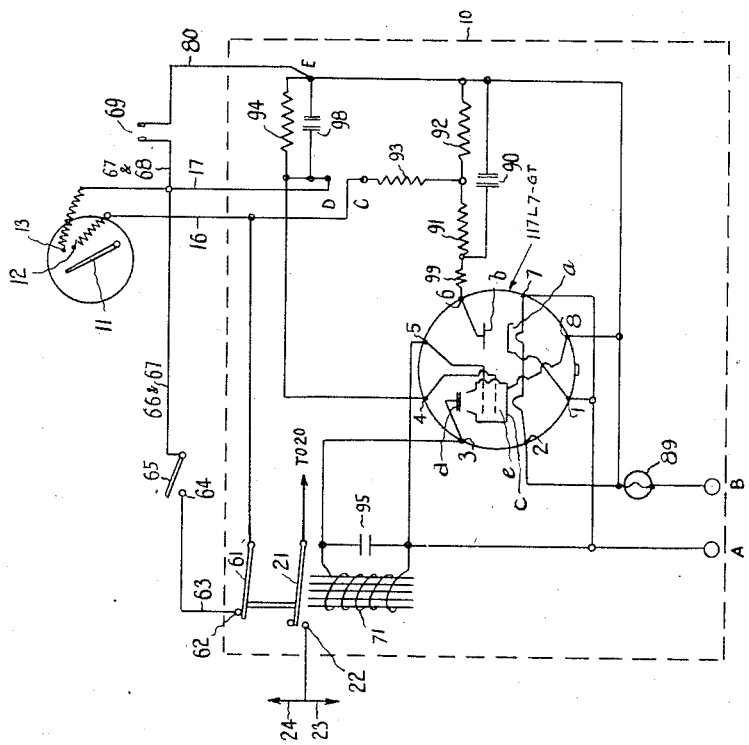
Fig. 2 is a diagram of the electronic control relay.

Figure 2 shows a wiring diagram of a suitable electronic relay for use at 10 in Figure 1. Such relays are well known to the art so will not be described in detail, but sufficiently to explain its connection to the oven controls.

The elements of the electronic relay are shown within the dotted rectangle 10 in Figure 2, and the connections for controlling the relay have also been shown. The relay involves a single electronic tube of the type 117L7-GT which embodies a half-wave rectifier unit and a beam power amplifier. The cathode a and anode b of the rectifier unit are connected in series with resistance elements 91, 92 and 99 across an alternating current source A—B, and a condenser 90 is shunted across resistance elements 91 and 92 in series. The rectifier charges condenser 90, and the leakage from the condenser through resistors 91 and 92 creates a suitable source of grid biasing voltage for the amplifier unit. The cathode c and the anode d of the power amplifier are connected across the supply circuit A—B in series with the relay coil 71 which controls contact arm 21 of the power switch and this circuit is connected to be energized by the half-wave pulses which are not rectified by the rectifier unit. A smoothing condenser 95 is connected in shunt to the coil 71 to prevent chattering of armature 21 of the relay due to the alternating current supply. The control grid e of the amplifier is connected to the outer terminal of resistor 92 through a series resistor 94 which is shunted by a condenser 96. A conducting path including a current limiting resistor 93 extends from the midpoint between resistors 91 and 92 to the grid terminal of resistor 94, but this path is normally open at the points C—D, which points are connected to meter contacts 12 and 13, respectively. A contact arm 61 is operated by relay armature 21 and engages contact 62 when the relay is de-energized. This contact arm serves to bridge the points C and D through blade 65 of the roast-bake switch when this switch is in "roast" position. A pair of normally open contacts 69 of the preheating relay are connected in shunt to points D and E for the purpose of discharging condenser 98 as will be explained hereinafter.

When D and C are connected through the meter contacts 12, 13 described previously, the voltage drop across resistor 92 gradually charges condenser 98 at a speed depending on its capacity, the resistance of the current limiting resistor 93, and the value of the leakage resistor 94.

As the condenser 98 charges, it creates a negative grid bias which greatly reduces the current flow through the relay coil 71, and power switch arm 21 springs out under the action of a biasing spring not shown. When a lower oven temperature causes the meter needle 11 to break its connection between D and C, condenser 98 discharges at a rate depending on the value of resistor 94. When it discharges, the grid bias drops, the beam power amplifier passes current, and the power switch arm 21 is again pulled in.

Since resistor 93 passes very little current, it will be apparent that even if D and C were in contact, an additional direct connection between D and E would keep the condenser 98 discharged, and cause the power switch arm 21 to pull in for lack of grid bias. This control of the D to E connection over the D to C connection is made use of to start the roasting cycle as will be explained later.

Suitable values for resistor 93, resistor 94, and condenser 98 are chosen so as to delay the response of the relay to the meter pointer contacts by a few seconds. This prevents chattering of the relay from vibration of the meter pointer.

This electronic relay circuit allows the very sensitive and delicate thermocouple operated meter to control a relay capable of handling the heavy amperage required to heat a range oven.

The operation of Figure 1 is as follows: It will be assumed that the "roast-bake" switch 47 is in "bake" position. When the heat selector switch 60 is turned to any position except "off," the current flows through line wire 18, fuse 74, wire 25, contacts 26 as cam 55 no longer holds them open, wire 31 to point B in the electronic relay 10. Point A is normally connected to the neutral wire of the 110–220 volt single phase service. This heats the relay tube filaments and relay coil 71 operates contact arms 21 and 61 of the power switch.

When 21 closes on 22, a return path is created for the current in whichever heating element is connected by switch 60. The return path or paths will be completed through wires 23 and 24, contact 22, 21, fuse 73 and line wire 20.

On "broil" the current path is through wire 18, fuse 74, wire 25, contacts 30 as hollow in cam 57 allows them to close, wire 36, elements 2b and 2a to return wire 24. Current will also flow from element 2b, through wire 43, wire 44, pilot bulb 45 to return wire 24. Pilot bulb 45 is preferably arranged within casing 8 behind a window having a red lens or cover. This light is energized by the voltage drop across heating unit 2a which is comparatively low during broiling and is higher during preheating. On "low" the hollow in cam 56 closes contacts 28, and current goes through wire 35, element 2e, 2d, and 2c to return wire 23. Current also flows through wire 37, wire 38, pilot bulb 39 to return wire 24. Pilot bulb 39 is preferably arranged within casing 8 behind a window provided with a green lens or cover. This bulb is lighted only for the baking positions of the heat selector switch. On "medium" the hollow in cam 57 allows contacts 29 to close. Current then flows through wire 34, element 2d, and element 2c to return wire 23. This shorter path offers less resistance and the wattage consumed is higher. On "high" the hollow in cam 56 allows contacts 27 to close, and current flows through wire 33 and element 2c to the return wire 23. This shortest current path gives highest wattage and, therefore, highest baking temperature.

On "medium" and "high," current goes back through 2e, or 2e and 2d, wire 35, wire 37, wire 38 and pilot bulb 39 to return wire 24. If switch 60 is on "low," "medium" or "high," wire 37 will be alive. If push button 40 of the preheating relay is then pushed in, current will flow through wire 37, contact arm 41, contact 49, wire 48, switch blade 47a, wire 50, relay coil 51, and wire 52 to return wire 24, it being understood that the "roast-bake" switch is on "bake." The current in coil 51 will then draw in armature 53 and hold contact arm 41 in contact after the push button 40 is released. The preheating relay is self-locking.

Current will also flow from wire 37, contact arm 41, contact 42, wire 43 and element 2a to return wire 24. Element 2b has been by-passed or cut out, and the shorter path through 2a alone allows a higher wattage to be drawn for preheating. When the "preheat" period is over, contact arm 21 is opened as connection is made between D and C when meter pointer 11 shorts contacts 12 and 13. This disconnects the return circuit, thus turning off pilots 39 and 45, element 2a, the bottom element or elements, and releases the preheat relay 51 which will not again function until manually operated.

During preheating, and when the switch 60 is on "low," current flows through wire 25, contacts 28, wire 37, contacts 41 and 42, wire 43 to element 2a. That is, element 2a is supplied with current directly. On "medium," element 2a receives its current through line 25, contacts 29, wire 34, and back through element 2e, wire 35 and then through wire 37, contacts 41—42, and element 2a. On "high," element 2a receives its current through line 25, contacts 27, wire 33, and back through both elements 2d and 2e, wire 35, and then through wire 37, contacts 41—42, and element 2a. Thus, it will be seen that during preheating two circuits are completed through the heating elements, one of which always includes the broiling element 2a and the other or lower circuit always includes the baking element 2c. The baking elements 2d and 2e will be included in one or the other of these circuits depending upon the position of the heat selector switch 60. When an element is cut out of the lower circuit it is automatically included in the upper circuit.

It may be noted that during preheating, elements 2a, 2c, 2d and 2e are connected serially in a closed loop by conductors 23, 35, 37, the preheating relay, conductor 43 and conductor 24. This loop is connected to supply line 20 through the power switch 21, and the other side of the supply line 18 is connected through the heat selector switch to the loop at any one of the points of connection between adjacent heating elements.

This keeps the preheat current load, and preheat heating speed substantially the same, whether the selector switch is on "low," "medium" or "high."

When the "roast-bake" switch 47 is on "roast," the relay coil circuit is broken at switch blade 47a. The relay cannot then give a "preheat" cycle when button 40 is pushed in.

On the "bake" position of switch 47 the lower oven elements will turn on again every time the temperature drops below the dial setting, and the D to C connection is broken.

When the "roast-bake" switch 47 is on "roast" and a thermocouple 4 is inserted in the roast, once it reaches the control setting temperature, it is desirable to have the oven turn off and stay off until the roast is removed from the oven. This is accomplished as follows.

When the roasting is completed, connection is made between D and C by pointer 11 and the contact arms 21 and 61 will open. If the "roast-bake" switch is on "roast," connection is made through D, wire 17, wire 67, wire 66, switch blade 65, contact 64, wire 63, contact 62 and contact arm 61 to C. This effectively maintains the D to C connection, and the control cannot recycle.

To start the "roast" cycle this lock-out connection must be broken. As explained previously, a momentary connection between D and E will discharge condenser 89 and will cause the electronic relay to draw in the relay contact arms and thus break the D to C connection at 61 and 62.

This D to E connection is made from D, wire 67, wire 68, contacts 69, and wire 70 to E, by pushing in button 40 momentarily.

Push button 40 has the dual function of starting the "preheat" cycle during baking, and starting the roasting cycle for roasting.

Figure 3:
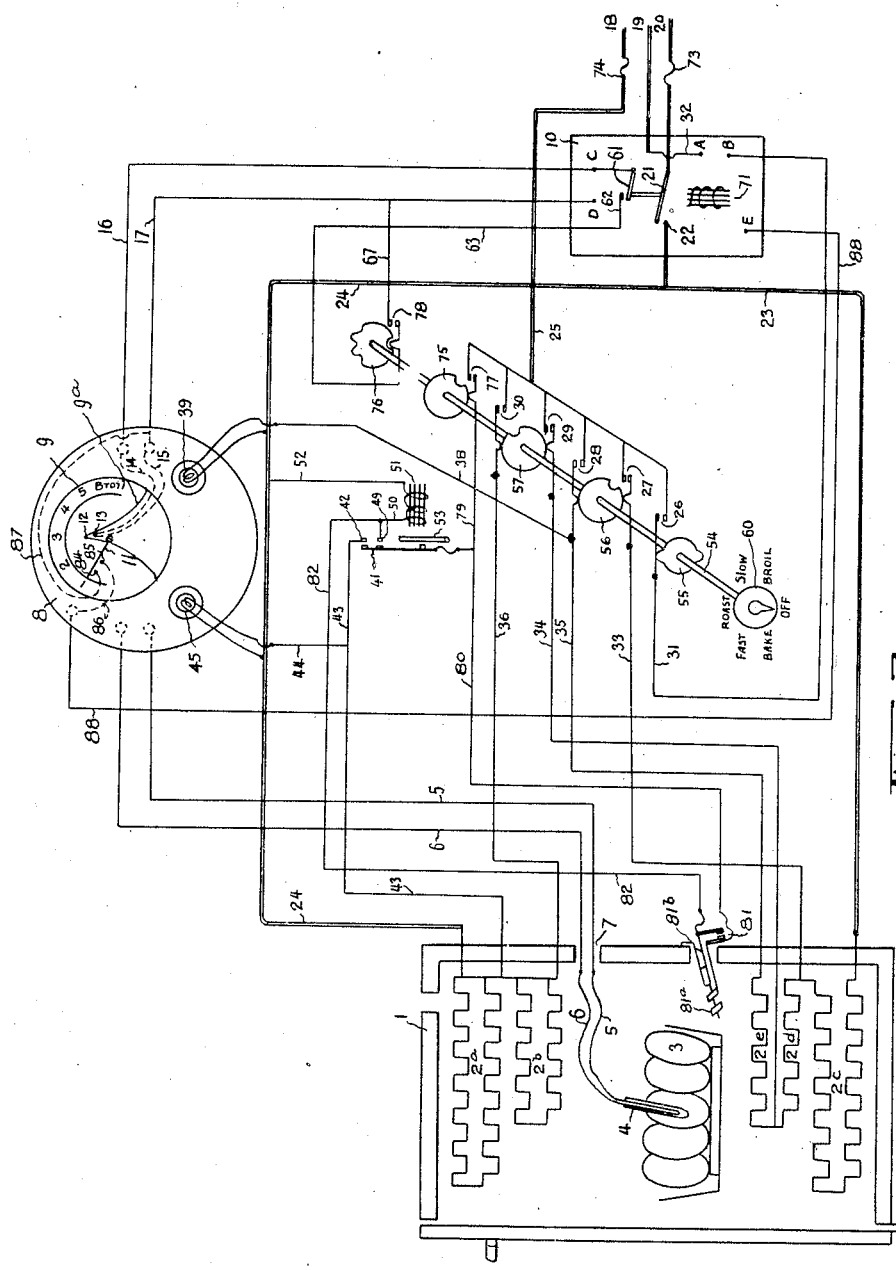
Fig. 3 is a view similar to Fig. 1 showing a modification.

Figure 3 is a modification of Figure 1 in which the functions of the push button and "roast-bake" switch are preformed automatically.

The connections for supplying current to the various heating elements are the same as in Figure 1 except that for preheating, the return connection for element 2a is completed through wire 43, contacts 41—42 of the preheating relay, wire 79 and through contacts 77 controlled by cam 75 on the heat selector switch 60, and back to wire 25. Also, instead of being actuated manually, the preheating switch blade 41 is actuated electrically by a circuit extending from wire 24 and including coil 51 of the relay and contacts 81 of a thermostatic switch located in the oven, and through contacts 77 of the heat selector switch and back to wire 25. One further difference is that the "roast-bake" switch 47 of Figure 1 is omitted, and in its place is substituted switch contacts 78 which are operated by cam 76 on the heat selector switch 60. Still another difference is that instead of making the D to E connection by means of contact 69 operated by push-button 40, this connection is made by the meter needle 11 bridging a pair of contacts 84, 85 which are connected to the points D and E of the electronic relay by suitable connections as shown.

When switch 60 is turned to "bake," the hollow in cam 75 allows contacts 77 to close. Current then flows through wire 79, wire 80, contacts 81, wire 82, wire 50, relay coil 51 and wire 52 to the return wire 24. This draws in relay armature 53 and closes contact arm 41 on contacts 42 and 49. Current now flows from wire 79, through contacts 41 and 49, wire 50, coil 51 and wire 52 to return wire 24, and thus holds in the preheating relay independently from contacts 81. Current also flows through contacts 41 and 42, wire 43, and heating element 2a to return wire 24, thus giving preheating by elements 2a and 2c on the "bake"

position of selector switch 60. The circuit through baking element 2c is completed through selector switch contacts 27. When the pointer 11 comes up to the setting of indicator 9a, the "D" to "C" connection is made through contacts 12 and 13 and the electronic relay releases contact arm 21 of the power switch. This turns off the element 2a, relay coil 51, and the bake element 2c. When the temperature drops, and pointer 11 removes the D to C connection, switch arm 21 pulls in and supplies current to element 2c. By this time the bi-metal coil 81a will be heated by the oven temperature. On heating above a temperature of about 200 degrees Fahrenheit, coil 81a turns shaft 81b sufficiently to separate contacts 81, and thus prevents the preheat relay from locking in. That is, the preheat element only comes on for the first heating cycle when the oven is cold or below 200 degrees.

Cam 76 has two hollows to locate the heat selector switch 60 in its "off" positions, and two extra hollows which act in the two "roast" positions ("fast" and "slow") to close contacts 78. When the roasting cycle is over, and power switch arm 21 opens, contact arm 61 drops out to touch contact 62, thus completing the "D" to "C" lockout connection through wire 63, contacts 78, wire 67 and wire 17.

The roasting cycle is initiated by the D to E connection as before. But this time the connection is made through a pair of contacts 84 and 85 mounted on the face of the meter and positioned to be bridged by the needle 11 when it returns to its cold position. Contact 84 is connected by wire 87 to wire 17 which leads to terminal D, while contact 85 is connected by wires 86 and 88 to terminal E. Roasting will always be started when the oven is cold, and the needle is at the lower end of the scale touching contacts 84 and 85, or even with a hot oven the thermocouple probe will be inserted into a cold roast and the pointer will return to its cold position.

The other details of Figure 3 are quite similar to Figure 1 and can easily be followed with an understanding of the description of Figure 1.

It is intended that the invention should include any combination of these manual and automatic means for initiating the preheat and roast cycles in one unit.

The drawings are meant to illustrate the circuits only, and not actual construction of the parts, which will be modified as manufacturing practice dictates.

Although the invention has been described in relation to ovens it will be apparent that it is applicable to the regulation of heating elements embodied in an electric heating plate or surface burner.

I claim:

1. In an electric oven, the combination of a broiling circuit including a plurality of heating elements, a baking circuit including a plurality of heating elements, a heat selector switch having one position for completing said broiling circuit and a plurality of positions for completing said baking circuit through different heating elements thereof, and a preheating circuit controlled by said selector switch in said baking positions and including at least one heating element of said broiling circuit, said preheating circuit being so reconnected that any baking elements not included in said baking circuit are connected in series with said preheating circuit.

2. In an electric oven, the combination of a heating circuit, a power switch for said heating circuit, a temperature responsive device having a movable element for opening said power switch when the temperature of said oven reaches a predetermined value and for closing said power switch when the temperature drops below said predetermined value, a preheating circuit also controlled by said power switch, an electromagnetic relay for completing said preheating circuit, said relay having a self-locking energizing circuit whereby said preheating circuit is opened upon the first opening of said power switch and remains open upon the subsequent reclosing of said power switch.

3. In an electric oven, the combination of a plurality of heating elements, a heat selector switch having one position for connecting said elements in a "roast" circuit and another position for connecting said elements in a "bake" circuit, a power switch for controlling both of said circuits, a temperature responsive relay for opening said power switch when the temperature of said oven reaches a predetermined value in either position of said selector switch and being operative in the "bake" position of said selector switch for closing said power switch when the temperature drops below said predetermined value, and means controlled by said selector switch in "roast" position for preventing reclosure of said power switch upon the first opening thereof.

4. In an electric oven, the combination of a heating circuit, a power switch for said heating circuit, a temperature responsive device for opening said power switch when the temperature of said oven reaches a predetermined value and for closing said power switch when the temperature drops below a predetermined value, a preheating circuit also controlled by said power switch, a relay for completing said preheating circuit, a thermostatic switch having normally closed contacts included in the energizing circuit of said relay and being operative to open said energizing circuit at a temperature of said oven below said predetermined value, and contacts operated by said relay for completing said energizing circuit independently of said thermostatic switch.

5. In an electric oven, the combination of a heating circuit, a power switch for said heating circuit, a temperature responsive device controlled by the heat of said oven and having a movable element for opening said power switch when the temperature of said oven reaches a predetermined cooking value and for closing said power switch when the temperature drops below said predetermined value, manually settable lockout means controlled by the opening of said power switch for preventing reclosure of said switch when the temperature of said oven drops below said predetermined value, and means controlled by said movable element when it reaches a position corresponding to a temperature substantially lower than said cooking value for disabling said lock-out means.

6. In an electric oven, the combination of a heating circuit, a power switch for said heating circuit, a temperature responsive device for opening said power switch when the temperature of said oven reaches a predetermined value and for closing said power switch when the temperature drops below a predetermined value, a preheating circuit also controlled by said power switch, a relay for completing said preheating circuit, a thermostatic switch having normally closed contacts included in the energizing circuit of said relay and being operative to open said energizing circuit at a temperature of said oven below said predetermined value, contacts operated by said relay for completing said energizing circuit independently of said thermostatic switch, said energizing circuit being provided with means controlled by said thermostatic switch for re-energizing said self-locking relay when said thermostatic switch contacts reclose on return to a low temperature position.

7. An electric oven according to claim 3 and including means rendered operative in the "roast" position of said selector switch and controlled by said temperature responsive relay for closing said power switch at a temperature of said oven substantially lower than said predetermined value.

8. In an electric oven, the combination of a plurality of broiling elements, a plurality of baking elements, a heat selector switch having one position for completing a broiling circuit and a plurality of positions for connecting different numbers of baking elements in a baking circuit to establish different heat conditions in said oven, a preheating relay having an energizing winding, a lock-in circuit for said relay including normally open contacts carried by said relay, means for closing said normally open contacts, a preheating circuit including at least one of said broiling elements and a pair of normally open contacts carried by said relay, and means including contacts operated by said selector switch for supplying current to the energizing winding of said preheating relay in any of the "bake" positions of said selector switch, and only in said "bake" positions.

9. In an electric oven, the combination of a plurality of heating elements, a heat selector switch having one position for connecting said elements in a "roast" circuit and another position for connecting said elements in a "bake" circuit, a power switch for controlling both of said circuits, a temperature responsive relay for opening said power switch when the temperature of said oven reaches a predetermined value and for closing said power switch when the temperature drops below a predetermined value, a double-throw switch having a "bake" position and a "roast" position, a preheating circuit energized by said double-throw switch in "bake" position, and means controlled by said double-throw switch in "roast" position for preventing reclosure of said power switch after the first opening thereof by said temperature responsive relay.

10. In an electric oven, the combination of a plurality of heating elements, a heat selector switch having one position for connecting said elements in a "roast" circuit and another position for connecting said elements in a "bake" circuit, a power switch for controlling both of said circuits, an electronic relay for controlling said power switch, a temperature responsive device controlled by the heat of said oven and being operative to open said power switch when the temperature of said oven reaches a predetermined cooking value, and for closing said power switch when the temperature drops below said value, lock-out means controlled by said heat selector switch in "roast" position for preventing reclosure of said power switch following the first opening thereof, and means controlled by said temperature responsive device at a "cold" temperature of said oven for disabling said lock-out means and initiating a new "roast" cycle.

11. In an electric oven, the combination of a plurality of heating elements, a heat regulating switch having one position for connecting said elements in a "roast" circuit and another position for connecting said elements in a "bake" circuit, a power switch controlling both of said circuits, a temperature responsive relay for opening said power switch when the temperature of said oven reaches a predetermined value in either position of said heat regulating switch and being operative in the "bake" position of said switch for closing said power switch when the temperature drops below said predetermined value, and means controlled by said heat regulating switch in "roast" position for preventing reclosure of said power switch upon the first opening thereof.

MERVIN H. CODY.

REFERENCES CITED

The following references are of record in the file of this patent:

UNITED STATES PATENTS

| Number | Name | Date |
| --- | --- | --- |
| 1,757,729 | Marrison | May 6, 1930 |
| 1,858,271 | Harness et al. | May 17, 1932 |
| 1,893,847 | Simpson | Jan. 10, 1933 |
| 2,058,829 | Rothe | Oct. 27, 1936 |
| 2,075,869 | Sherrick et al. | Apr. 6, 1937 |
| 2,207,634 | Myers et al. | July 9, 1940 |
| 2,207,870 | Myers | July 16, 1940 |
| 2,207,871 | Myers | July 16, 1940 |
| 2,210,947 | Myers et al. | Aug. 13, 1940 |
| 2,213,993 | Myers | Sept. 10, 1940 |
| 2,215,404 | Myers | Sept. 17, 1940 |
| 2,224,983 | Parkhurst | Dec. 17, 1940 |
| 2,268,737 | Brown | June 6, 1942 |
| 2,276,930 | Clark | Mar. 17, 1942 |
| 2,327,925 | Myers | Aug. 24, 1943 |
| 2,363,326 | Hodgkins | Mar. 21, 1944 |